United States Patent
Dalal et al.

(10) Patent No.: US 6,868,544 B2
(45) Date of Patent: Mar. 15, 2005

(54) METHOD AND SYSTEM FOR GENERAL-PURPOSE INTERACTIVE NOTIFICATIONS

(75) Inventors: Siddhartha R. Dalal, Bridgewater, NJ (US); Hyong Sop Shim, Basking Ridge, NJ (US); John R Wullert, II, Martinsville, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 761 days.

(21) Appl. No.: 09/732,568

(22) Filed: Dec. 8, 2000

(65) Prior Publication Data

US 2002/0073158 A1 Jun. 13, 2002

(51) Int. Cl.[7] .............................................. G06F 9/00
(52) U.S. Cl. .................. 719/318; 719/315; 719/316; 719/317
(58) Field of Search ................................ 709/201, 202, 709/203, 205, 206, 200; 719/315, 316, 317, 318

(56) References Cited

U.S. PATENT DOCUMENTS

| | | | | |
|---|---|---|---|---|
| 5,742,905 | A | | 4/1998 | Pepe et al. .................. 455/461 |
| 5,935,211 | A | * | 8/1999 | Osterman .................... 709/228 |
| 6,279,112 | B1 | * | 8/2001 | O'Toole et al. ............. 713/201 |
| 6,560,318 | B1 | * | 5/2003 | Spielman et al. ........ 379/88.12 |

* cited by examiner

Primary Examiner—Nabil El-Hady
(74) Attorney, Agent, or Firm—Joseph Giordano

(57) ABSTRACT

An Object-Based Contact List (OBCL) allows users to interact with multiple Notification Service Providers (NSP) on a network simultaneously. The NSPs provide smart events wherein notification of the user may be governed by response logic as defined in an NSP-based program.

6 Claims, 16 Drawing Sheets

METHOD AND SYSTEM FOR GENERAL-PURPOSE INTERACTIVE NOTIFICATIONS

FIELD OF THE INVENTION

The present invention relates to data storage and processing systems including computing and communications systems in general and more particularly to interactive notification methods and systems.

BACKGROUND OF THE INVENTION

Data users continuously seek greater functionality and ease of use from the data processing and storage systems that they utilize. Increasingly, data users require instant, anytime-anywhere access to their data including business as well as personal data. The users are increasingly relying upon systems including personal computers, cellular phones, Personal Digital Assistants (PDAs), and other computing and communications tools to receive general email and other information such as stock quotes, airline flight status and weather updates that may be requested or "pulled" from a location or that may be "pushed" to the user based upon preset parameters.

Such computing and/or communications tools may be referred to as notification tools and the data received on a notification tool may be collectively referred to as a notification. A notification often contains the latest state information on some data in which a user has an interest. Notification tools include software programs that are executed on a general purpose computer connected to a communications network such as a buddy presence monitor in an instant messaging program running on a computer connected to the Internet. Similarly, notification tools include somewhat specialized hardware and software systems such as PDAs. Additionally, notification tools include dedicated communications hardware such as a pager.

The existing notification tools do not satisfy the needs of data users for several reasons. Many notification tools do not support interactive communications. For example, a user may use a one-way pager to receive messages and certain service providers provide notifications, such as the recent quotation of a stock price, but such an arrangement does not allow the user to take further action such as placing a trade. Accordingly, the user is not able to utilize the same notification tool to receive and respond to a notification.

Additionally with current notification tools users often have to use several different tools to receive the notification services that they require. Certain notification service providers or vendors such as America Online bundle a variety of notification services into a single tool. However, as soon as the user requires a service that is not available from that vendor, the user has to obtain another notification tool from the vendor that provides the required notification service.

For example, notification tools that provide a degree of interactivity with the notifications include the instant messenger (IM) tools known as AOL Instant Messenger (SM) and Microsoft MSN® Messenger Service. An IM tool may allow the user to keep track of the online presence state of the user's contacts including whether the contacts are online or busy. Additionally, an IM tool may allow a user to receive a presence notification whenever the online state of a contact changes. IM contacts are also known as buddies. In addition, IM tools may allow the user to respond to a received presence notification in order to start an instant messaging session with an online contact, to send an e-mail or voice-mail to an offline buddy, or to send a voicecall to an online buddy. The part of the IM tool or application that displays the presence update notifications for the user's contacts is known as a buddy list or contact list.

Many IM tools have several shortcomings. By definition, the contacts in the instant messaging tools may be human users, and the contact lists are designed to support only voice/text message communications between human users. However, many communications that a user may wish to perform involve interaction between human users and non-human objects. Accordingly, many contact lists have the disadvantages that they do not support non-human contacts and that they do not support interactions between human users and non-human objects.

Similarly the response logic of IM tools for a presence update notification may be statically bound to either initiating a voice/text instant messaging session with an online buddy or sending an e-mail/voice mail message to an offline or busy buddy. However, it is unlikely that the communications between human users and non-human objects would take the form of instant messaging or asynchronous exchanges of informal messages. Instead, it is likely that the communication between the human user and the non-human object would include the exchange of data such as formal commands, responses and acknowledgments. Accordingly, many contact lists have the disadvantage that they do not support other types of response logic.

Additionally IM tool contact lists function as a front-end to a single monolithic service provider. Accordingly, contact lists have the disadvantage that they do not support multiple service providers at the same time and do not support semantics suitable for instant messages to any notification service provider to which the contact list subscribes, including those with non-human contacts. Consequently, many contact lists also have several other disadvantages. For example, different notification service providers are likely to use different response protocols or languages of available commands and responses to provide their services. Therefore, the required contact list response logic for a given contact may be different from that for other contacts and is not supported by contact lists. Similarly, contact lists do not support varied response logic for the same contact and they do not support dynamic loading or modification of the response logic based upon factors such as the notification sent or other parameters.

Delivery of voice and text messages among various communications tools may be coordinated based upon preset delivery options as described in U.S. Pat. No. 5,742,905 to Pepe, et al. Furthermore, certain communications tools such as World Wide Web browsers include the integrated ability to download and display different types of documents and images. However, conventional notification tools do not allow users to subscribe different types of notification services from different vendors simultaneously and do not allow data users to interact with their data by enabling them to seamlessly respond to notifications.

These and other shortcomings greatly limit the usefulness of conventional notification tools and do not fulfill the need of data users for an anywhere-anytime tool for accessing and manipulating business and personal data.

SUMMARY OF THE INVENTION

The present invention is directed to providing a method and system for a general purpose, interactive notification tool. In an illustrative embodiment, the invention provides for an interactive communications paradigm known as a smart messaging system that comprises an object based contact system employing lists (referred to herein as the OBCL system), Notification Service Providers (NSPs) and smart events. The smart messaging system supports both synchronous and asynchronous interactions. The smart messaging system also enables the users to dynamically subscribe to only the services they need.

An OBCL system allows a user to interact with multiple objects on a network simultaneously. The objects utilized in the smart messaging system are known as notification service providers (NSPs) which provide notification services Traditional instant messaging services are examples of single-purpose dedicated notification service providers. In contrast, an OBCL enables a user to subscribe to a variety of notification services on the network on an as-needed basis. A smart event represents a state update notification from the NSP to the OBCL.

The smart event encapsulates the required response logic for the notification and is therefore referred to as a smart event. The response logic for a given notification is preferably defined by the NSP to comprise computer program instructions that control if and how a user can respond to a notification.

In traditional event notification systems, an event encapsulates only opaque data, and event subscribers are assumed to know how to respond to the event. In contrast, in the illustrative embodiment disclosed, the NSPs are the event publishers and they utilize smart events to control how the OBCLs that are the event subscribers respond to their events. Accordingly, an OBCL may be built once and yet be utilized for different services of different NSPs simultaneously.

The contact list or OBCL supports non-human contacts allowing for automated data transmission, storage and processing. The OBCL may communicate with multiple notification service providers at the same time.

In one illustrative embodiment, the OBCL processes response logic dynamically at runtime, rather than statically at compile-time. Similarly, the OBCL may utilize data from the NSP and may choose to utilize recently cached or compiled response logic. Accordingly, the smart messaging system allows dynamic adaptation to the notifications it receives at runtime and is more flexible than the traditional instant messaging systems that utilize static pre-compiled response logic.

The OBCL supports multiple types of response logic and supports different response logic for different notifications from the same contact with a NSP object. The OBCL also supports different response logic for different contacts at the same time. For example, a notification service provider may be an online auction system that provides its service by exchanging a series of notifications and responses with a contact list. The response logic utilized by the OBCL for a given notification may be different from that for an earlier or a subsequent notification. In a representative contact or session, a user employs the contact list to receive and respond to notifications from the online auction NSP for some auction lot. The OBCL and online auction NSP may interact as follows. First, after receiving a bid from a user, the online auction NSP provides a status notification of the bid and may allow response logic to cancel the bid. If someone outbids the user on the same product, the online auction NSP sends a real-time notification to the contact list with a different response logic. The user may respond to this notification by either making another bid or forfeiting the earlier bid. Upon receiving the user's response, the online auction sends another notification that confirms the user's response. The response logic of the most recent notification, for example, may refrain from further interaction with that contact or session with that NSP object unless another notification is received. Accordingly, the smart messaging systems support different response logic for the different notifications received from the same NSP in the same contact or session.

In one illustrative embodiment of the smart messaging process, the OBCL is a general-purpose, interactive notification tool in a smart messaging system. To receive notifications using the OBCL, the user should first have subscribed to a service provided by a notification service provider. When the user has successfully subscribed to a service of a notification service provider, the user has a service subscription, or simply subscription, with the notification service provider. However, before the user can receive any notifications on the OBCL, the user should be connected to the notification service provider and, if needed, be authenticated to the provider using the OBCL. Once this initial connect and setup process is complete, the user is ready to receive notifications. Thereafter, the user is known as an active subscriber, and the user's service subscription is known as active to the notification service provider. When the OBCL connects to the notification service provider, the notification service provider must prepare itself before it can send notifications to the OBCL. This preparation process is known as activating the service subscription of the OBCL. A service subscription of a notification service provider may be associated with a set of data items that comprise the subscription contents. When an update occurs on the value of such a data item, the notification service provider sends a notification to the current active subscribers of the service. Such a set of data items is referred to as the "data object" of the service subscription in the notification service provider. The change of the value(s) of one or more data items in a data object is known as a "state update" on the data object.

Furthermore, different notification service providers may have different mechanisms for allowing users to subscribe to their services. For example, an e-retailer may have a World Wide Web based mechanism for subscribing to a transaction notification service, whereas an instant messaging service provider may require the user to use a program known as a wizard to subscribe to its buddy presence and instant messaging service. The OBCL may be used as a general-purpose, interactive notification tool regardless of the particular mechanism used to create a service subscription with an NSP.

The object-based contact list (OBCL) is a general-purpose interactive notification tool that can be used to communicate with any object on a network that provides a notification service via smart events. While the name of the OBCL may be thought to imply reliance of the object-oriented (OO) programming paradigm, an object-oriented implementation is not required. In one illustrative embodiment, the OBCL utilizes the advantage of the class inheritance property of the OO paradigm which allows objects to have the same interface but provide different behaviors. However, even an the object-oriented design does not necessarily require an object-oriented implementation.

Accordingly, the smart messaging systems supports dynamic response logic and event-based notifications.

DETAILED DESCRIPTION OF THE PREFERRED EMBODIMENTS

Figure 1:
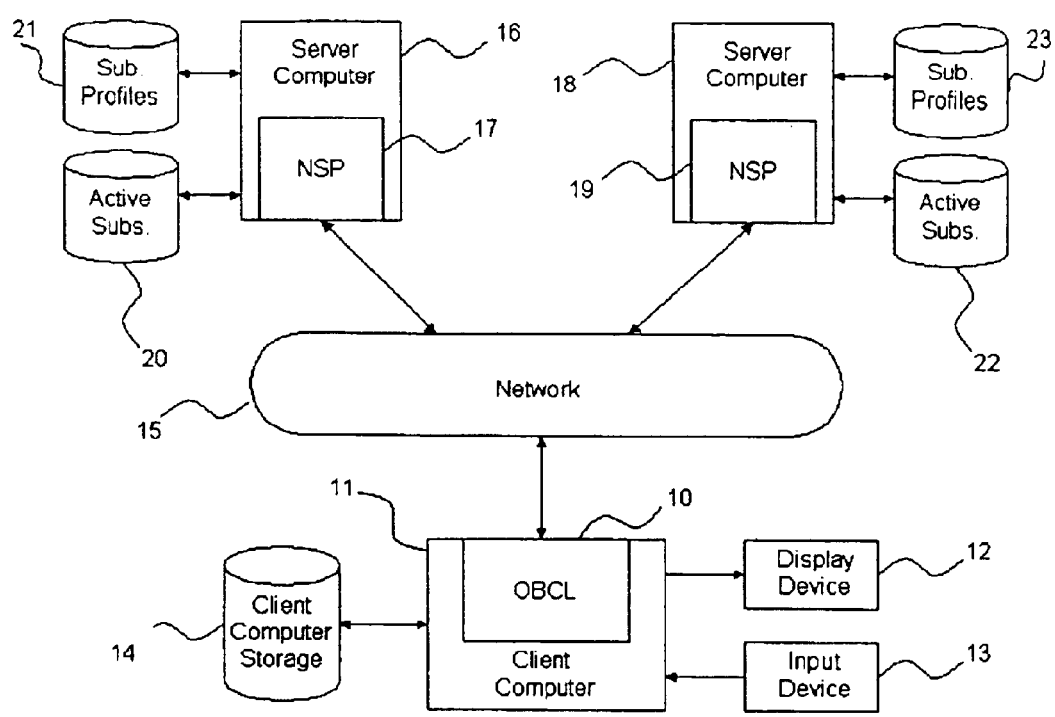
FIG. 1 is a block diagram of one illustrative embodiment of the smart messaging system of the present invention.

FIG. 1 depicts one illustrative embodiment of the smart messaging system of the present invention. As illustrated in FIG. 1, the OBCL 10 interacts with a communications network 15 and NSPs 17 and 19 to form a smart messaging system. The OBCL is preferably a computer program 10 that runs on a client computer 11. The OBCL 10 is written in a language appropriate for the operating system and platform of client computer 11. The smart messaging system preferably supports client computers 11 including desktop computers, laptop computers, Personal Digital Assistants (PDAs), cellular phones, pagers, or any device that provides an appropriate computing environment such as a machine having a processor and memory in which the program instructions of OBCL 10 can be executed. Client computer 11 includes an output device 12 such as a display or speaker that can be used to convey a variety of data from OBCL 10 to the user including the arrival of a new smart event. The OBCL 10 utilizes known or determined properties of the client computer 11 and the received OBCL data to determine the manner in which output device 12 conveys the OBCL data to the user including visually with graphics and/or text or acoustically with sounds or voice. In addition, client computer 11 has an input device 13, through which the user provides input data to OBCL 10. The OBCL 10 utilizes known or determined properties of the client computer 11 and/or smart event properties to determine the manner in which the user provides input data to OBCL 10 through input device 13. The smart messaging system preferably comprises client computers 11 having a non-volatile storage device 14 such as a hard disk or flash memory which can be used to locally store and retrieve the OBCL 10 and any OBCL-related data. Alternatively, if no storage device is available on a client computer 11 to locally store OBCL 10 and its data, OBCL 10 and its data may be downloaded to client computer 11 on an as-needed basis or may be sent to client computer 11 asynchronously via network 15 by e-mail or other communications protocol. Network 15 has a plurality of client computers, including client computer 11, and a plurality of server computers, including server computers 16 and 18. Each of server computers 16 and 18 runs at least one notification service provider, NSP 17 and 19, respectively. Each of NSP 17 and NSP 19 can provide a different notification service. NSP 17 may provide an instant messaging service, whereas NSP 19 may provide a portfolio tracking and management service, and OBCL 10 may subscribe to both NSP 17 and NSP 19 simultaneously. Each of NSP 17 and 19 is a computer program that communicates with OBCL 10 via network 15 using the IP communications protocol to provide its service. Each of server computer 16 and server computer 18 may be a mainframe computer, a desktop PC, or any device that provides a computing environment such as a machine, a processor and memory in which the program instructions of each of NSP 17 and NSP 19 can be executed.

NSP 17 manages, stores, retrieves, and updates its subscriber data on subscriber profiles database 21 and active subscriber database 20. Likewise, NSP 19 manages, stores, retrieves, and updates its subscriber data on subscriber profiles database 23 and active subscriber database 22. Each of subscriber profiles database 21 and subscriber profiles database 23 contains a subscription record associated with the OBCL 10 including the user name and information on the data items that comprise the contents of the subscription for OBCL 10. In a multi-user or otherwise distributed processing environment, the OBCL 10 may provide services to multiple users at the same time or to multiple users in a time-sharing environment. Each of active subscriber database 20 and active subscriber database 22 contains a record associated with OBCL 10, including the network address of client computer 11. The network address can preferably include abstract addresses for use when a Client computer 11 connects to network 15 using dynamic IP addresses. The user's current network address can be sent to the NSP at service activation. From the NSP perspective, a subscriber, the OBCL 10, is said to be active if the subscriber is connected to the server computer on which the NSP is running and is communicating with the NSP to receive the notification service of the NSP. The connection is preferably periodic and packet based. Each of subscriber profiles database 21 and active subscriber database 20 may be a set of files on the local file system of server computer 16, a local database system available on server computer 16, a remote database system that is connected with server computer 16 via network 15 or any other network to which server computer 16 may be connected, or a set of computers that are connected with server computer 16 via network 15 or any other network to which server computer 16 may be connected and that manage the subscriber data for NSP 17. Likewise, each of subscriber profiles database 23 and active subscriber database 22 may be a set of files on the local file system of server computer 18, a local database system available on server computer 18, a remote database system that is connected with server computer 18 via network 15 or any other network to which server computer 18 may be connected, or a set of computers that are connected with server computer 18 via network 15 or any other network to which server computer 18 may be connected and that manage the subscriber data for NSP 19.

FIGS. 2–6 provide a high-level overview of the notification service data flow between the OBCL 10 and NSP 19. The described data flow is illustrative and applies to the data flow between any OBCL and any NSP. The user first establishes a service subscription with NSP 19 using well known methods including authentication if necessary. The subscription may be processed using network 15 or other communications channels such as the telephone network. Accordingly, the manner in which the user establishes the service subscription with NSP 19 is implementation-dependent and does not affect the following description of the data flow. In this illustration, the user is using OBCL 10 to activate the subscription at OBCL 10 to receive and respond to service notifications on OBCL 10. The following description applies if the user activates the service subscription for the first time and if the user re-activates the subscription.

Figure 2:
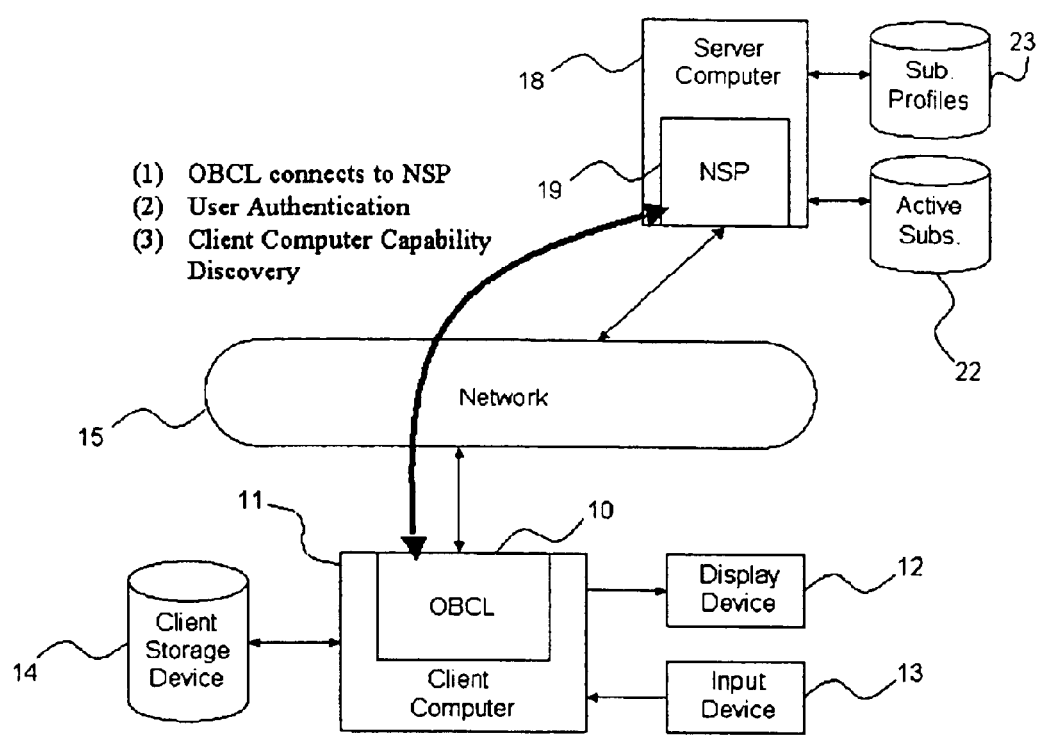
FIG. 2 is a block diagram of this embodiment of the present invention further illustrating the data flow of initial connection and setup.

FIG. 2 shows that OBCL 10 first connects to NSP 19 running on server computer 18 before it starts receiving a notification service from NSP 19. The OBCL 10 may obtain the network address and port number of NSP 19 by any known communications means depending on the specific implementation of OBCL 10 and NSP 19. In a preferred embodiment, the protocol for activation of subscription entails that the user sends the current networks address to the NSP either before or at the point of activation. In another embodiment, NSP 19 sends e-mail to client computer 11 after the user subscribes to NSP 19, and the user inputs the address data of NSP 19 to OBCL 10. Alternatively, OBCL 10 is dynamically downloaded to client computer 11 when the user subscribes to NSP 19, and the address data for NSP 19 is already embedded in the downloaded OBCL 10.

After OBCL 10 is connected to NSP 19, OBCL 10 authenticates the user to NSP 19. Any known method for user authentication can be utilized for authentication such as biometrics and preferably includes a user name and password. The method of authentication is specific to the particular implementations of NSP 19 and OBCL 10. An alternative method includes NSP 19 sending e-mail with the appropriate authentication data to the user after the user has subscribed to NSP 19. Another approach may be to have the user supply the authentication data as part of the service subscription process to NSP 19

Once the user is successfully authenticated, OBCL 10 collects data regarding the capabilities of client computer 11 and sends the collected capability data to NSP 19. The client computer capability data allows NSP 19 to determine the type of smart events to be sent to OBCL 10. For example, client computer 11 may be a wireless cellular phone with limited network bandwidth and limited display and input capabilities, in which case it may be inappropriate for NSP 19 to send a notification that is large in size and requires the user to perform sophisticated mouse manipulations to respond to the notification.

The client computer capability data is also utilized by NSP 19 to direct OBCL 10 to another NSP that can better serve OBCL 10 if appropriate. The computer capabilities data are preferably specified in terms of a parameter known as device type having values such as PC, PDA, and PAGER so that NSP 19 can utilize a predefined capability profile for the specified device type. Alternatively, the client computer capability data is defined in terms of individual capability attributes including network bandwidth, processor power, and input and display device capability.

Figure 3:
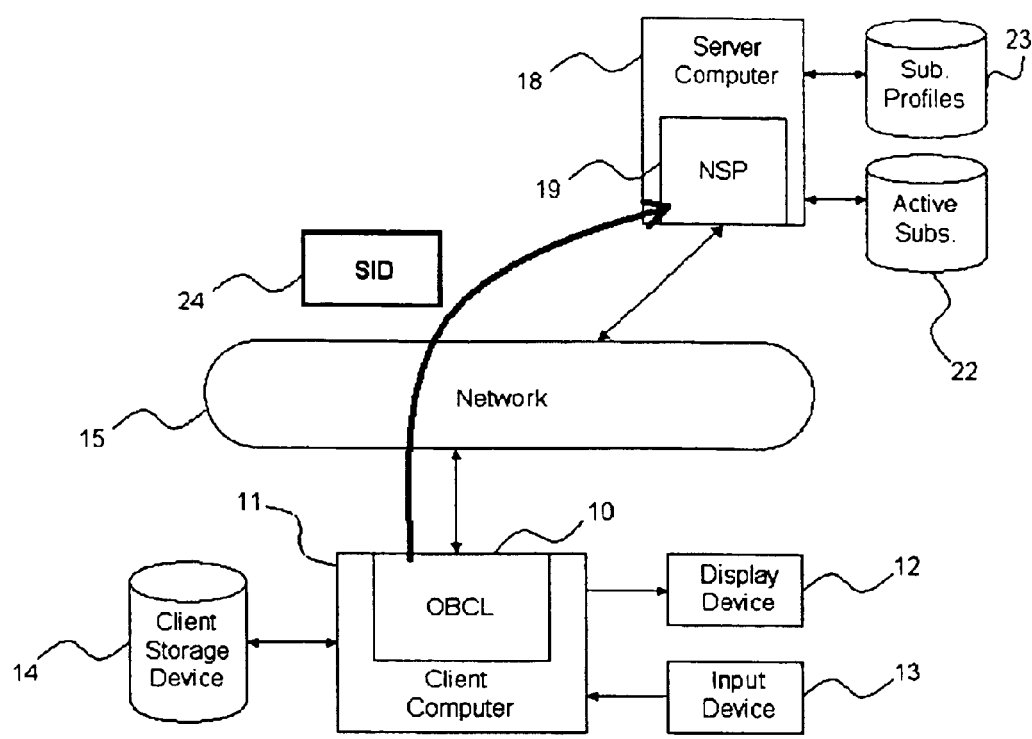
FIG. 3 is a block diagram of this embodiment of the present invention further illustrating the data flow of the subscription identifier.

After the initial connect and setup process, the OBCL sends a subscription identifier (SID) 24, to its NSP 19, FIG. 3. The subscription identifier is generated by the NSP 19 when the service subscription is established. The NSP 19 uses the subscription identifier to uniquely identify the subscription and find all the data relevant to the subscription, including a set of data items that comprise the contents of the subscription. The OBCL 10 may have multiple subscriptions with the same NSP 19, in which case, the NSP 19 assigns a unique SID 24 to each subscription. However, the OBCL 10 goes through the initial connect and setup process only once.

As shown in FIG. 3, the OBCL 10 sends SID 24 to NSP 19. The manner in which OBCL 10 obtains SID 24 depends on the specifics of the implementations of OBCL 10 and NSP 19. Preferably, NSP 19 sends an e-mail message with SID 24 to the user, who subsequently inputs SID 24 to OBCL 10 using input device 13. Alternatively, after the initial connect and setup process, NSP 19 may send to OBCL 10 a set of SIDs, including SID 24, each of which signifies a subscription the user has with NSP 19. After the initial connect and setup process, OBCL 10 sends SID 24 to NSP 19 to signal that OBCL 10 wishes to receive notifications pertinent to the subscription whose subscription identifier is SID 24.

Figure 4:
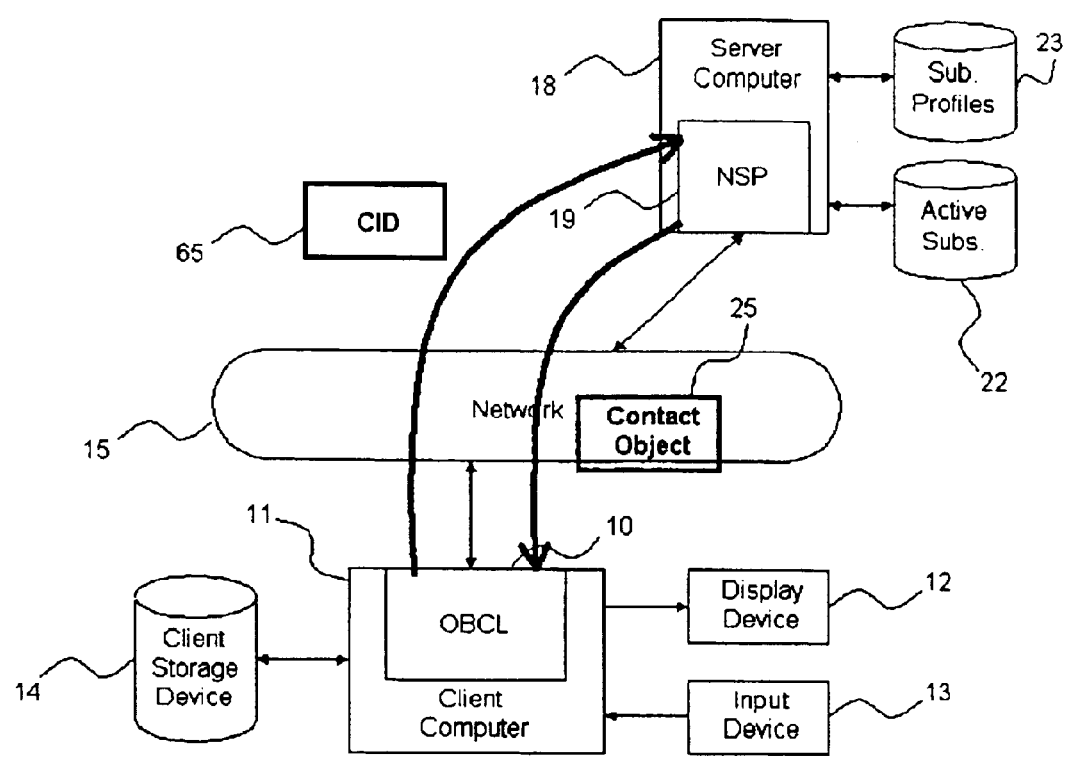
FIG. 4 is a block diagram of this embodiment of the present invention further illustrating a contact object and the data flow of a contact object.

After sending a SID 24, the OBCL 10 may send a contact identifier (CID) 65 to the NSP 19, FIG. 4. When the user is activating the service subscription for the very first time since the establishment of the service subscription, the OBCL 10 sends NULL as the value of the CID 65. The CID 65 is associated with a contact object 25, which is created by the NSP 19 to represent a service that the user is to receive from the NSP 19. As described more fully below the contact object 25 includes a service description and the current state of the service.

In general, the NDP 19 sends a contact object 25 to the OBCL 10 when the OBCL 10 connects to the NSP 19 for the first time after the user subscribes to the NSP 19. The contact object 25 may then be stored on the storage device 14 of the client computer 11 on which the OBCL 10 runs. In such a case, the OBCL 10 loads the contact object from the storage device into its runtime environment at startup and sends the CID 65 of the contact object 25 to the NSP 19 after sending the corresponding SID 24 to the NSP 19. Subsequently, the NSP 19 uses the CID 65 to uniquely identify the contact object 25. The CI D 65 also functions as a version number for the contact object 25, and together with the client computer capability data, allows the NSP 19 to decide whether or not to create and send a new version of the contact object 25 to the OBCL 10.

As shown in FIG. 4, OBCL 10 sends a CID 65 to NSP 19, and NSP 19 sends a new contact object 25 to OBCL 10. It may be that OBCL 10 is connected to NSP 19 for the first time or that OBCL 10 does not have an appropriate contact object 25 for the current service on client storage device 14. In such a case, OBCL 10 sends a NULL object in place of CID 65 to NSP 19, and NSP 19 sends contact object 25 to OBCL 10. If OBCL 10 has previously stored the contact object for the current service and sends CID 65, the contact identifier of the stored contact object, to NSP 19, and NSP 19 decides that OBCL 10 needs a new contact object 25. NSP 19 makes this decision when it discovers that the old contact object 25 is generated for a client computer 11 with a different set of capabilities and/or that there exists more a recent version of the contact object 25 for the current service; for example, the user may have received the service from NSP 19 using a different client computer 11 since the user last received the same service from NSP 19 on client computer 11.

Figure 5:
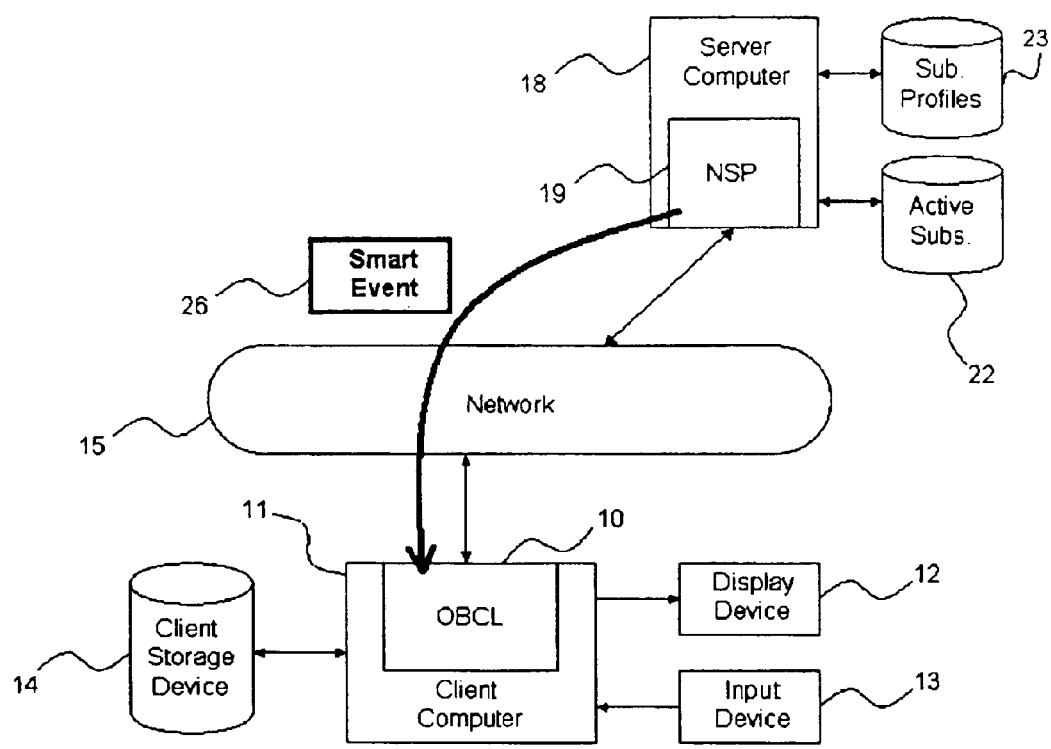
FIG. 5 is a block diagram of this embodiment of the present invention further illustrating a smart event and the data flow of a smart event.

When NSP 19 receives CID 65 from OBCL 10, NSP 19 considers OBCL 10 to be an active subscriber and sends notifications to OBCL 10 whenever state updates occur on the data items that comprise the subscription contents of OBCL 10. As shown in FIG. 5, NSP 19 sends a smart event 26 to OBCL 10 for each notification. Smart event 26 not only contains the latest state information on the subscribed data items but also contains program instructions that specify if and how OBCL 10 should respond to smart event 26. These program instructions are called the response instructions of a smart event 26. In addition, smart event 26 contains the subscription data, namely SID 24 as shown in FIG. 3, so that OBCL 10 can determine that smart event 26 is associated with contact object 25.

When the user decides to respond to smart event 26, the response instructions of smart event 26 are executed within the runtime environment of OBCL 10. Typically, the response instructions of smart event 26 allow the user to take appropriate actions on the current state of the subscribed data items at NSP 19. There are no limitations placed on the response instructions other than they must be executable using client computer 11. Appropriate security measures that are known in the art are preferably utilized.

Figure 6:
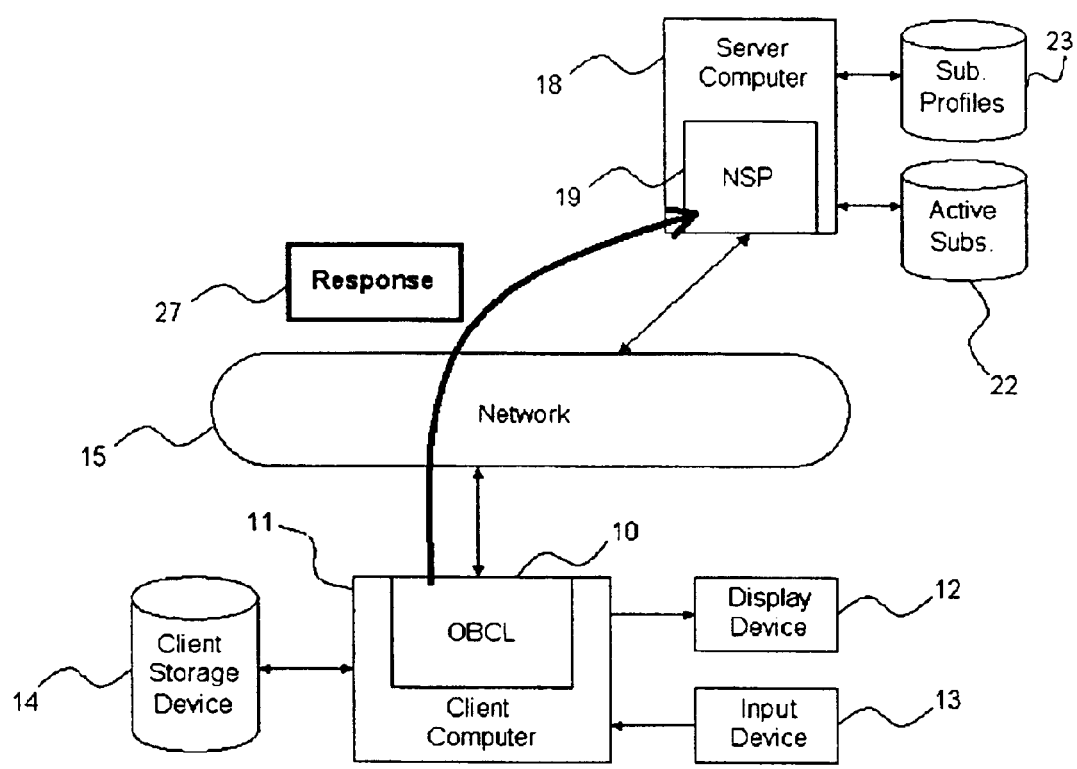
FIG. 6 is a block diagram of this embodiment of the present invention further illustrating a response and the data flow of a response.

As shown in FIG. 6, OBCL 10 sends a response object 27 to NSP 19. The response object 27 is generated and sent to NSP 19 only when NSP 19 has made such a request and accordingly is not utilized in every OBCL 10 contact or session with an NSP 19. That is, when NSP 19 creates smart event 26, it may specify that smart event 26 should send a response object to NSP 19. In such a case, smart event 26 creates response object 27 when its response instructions are fully executed and sends response object 27 to NSP 19, either directly or via OBCL 10. Typically, response object 27 includes any response data that results from executing the response instructions of smart event 26. Additionally, the NSP 19 may make a request for response object 27 if it wishes to directly handle the user's response to smart event 26. However, there are no limitations on the contents of smart event 26 or on the application contexts in which NSP 19 makes a request for response object 27.

Figure 7:
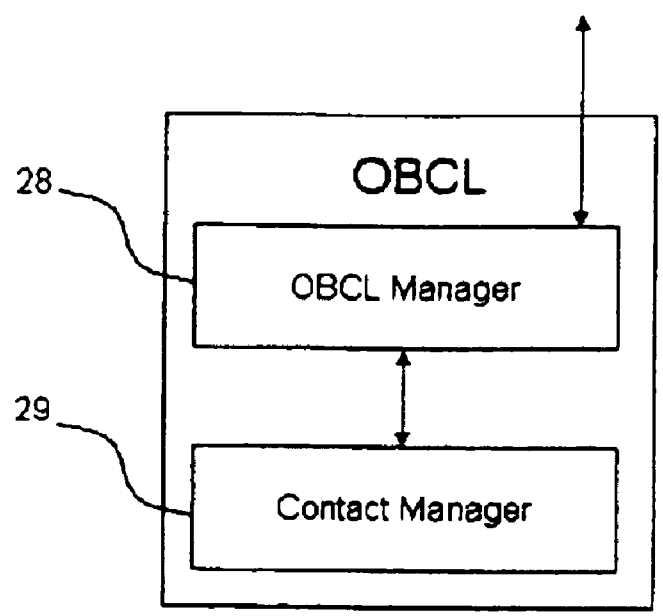
FIG. 7 is a block diagram of an illustrative object based contact list of a smart messaging system of the present invention.

As shown in FIG. 7, the internal architecture of the OBCL client program 10 preferably comprises two components: OBCL manager 28 and contact manager 29. OBCL manager 28 is mainly responsible for communicating with an NSP, e.g., NSP 19 in FIG. 2 through FIG. 6. For example, OBCL manager 28 establishes the connection with the NSP, authenticates the user to the NSP, sends the client computer capabilities to the NSP, receives the contact object and smart events from the NSP, etc. At the startup time of the OBCL client program, OBCL manager also initializes contact manager 29 with any contact objects that have been stored on the storage device of the client computer. Contact manager 29 is mainly responsible for managing contact objects and smart events. When OBCL manager 28 receives a contact or smart event object, it forwards the object to contact manager 29 for processing.

Contact manager 29 manages a list of contact objects that OBCL manager 28 receives from the NSPs. When OBCL manager 28 forwards a contact object to contact manager 29, contact manager 29 first finds an old contact object that has the same SID as that of the new contact object and then replaces the old contact object with the new contact object or adds a new contact object if no old one exists. (For the properties of a contact object, see FIG. 8). If no existing contact object is detected, a new object is added. When OBCL manager 28 forwards a smart event to contact manager 29, contact manager 29 first find the contact object that has the same SID as that of the smart event and then replaces the smart event of the contact object with that of the smart event (For the properties of a smart event, see FIG. 10). In addition, contact manager 29 is responsible for displaying alerts on the display device of the client computer upon the arrival of a new contact object or smart event. Furthermore, upon request, contact manager 29 performs an introspection of the class of a smart event to compute and display on the display device of the client computer a list of potential responses that the smart event supports. Upon the user's request, contact manager 29 also stores selected contact objects on the storage device of the client computer.

Figure 8A:
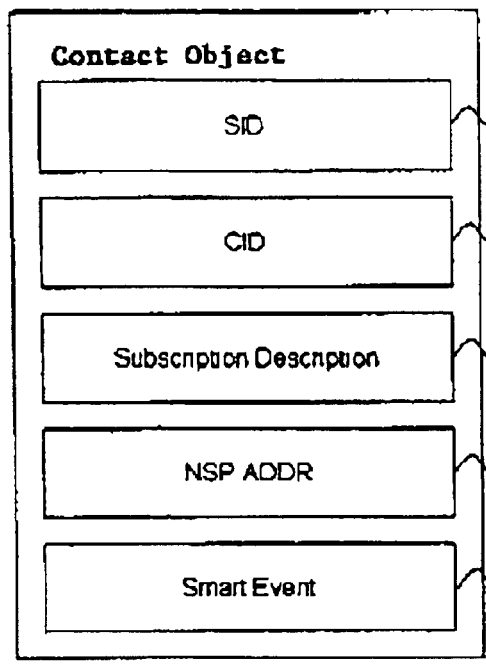
FIG. 8a is a diagram of an illustrative contact object of the present invention.
Figure 8B:
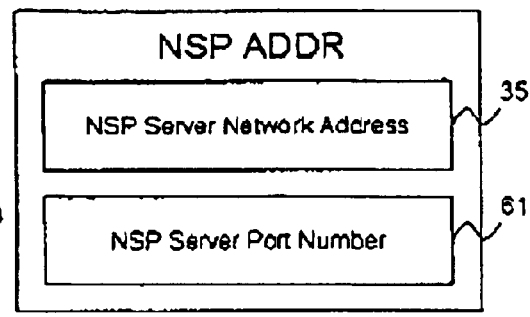
FIG. 8b is a diagram of an illustrative Notification Service Provider Address object of a contact object of the present invention.

FIG. 8a shows the key properties of a contact object. As discussed earlier, the contact object represents a subscription service that the OBCL is receiving from an NSP. All the attributes of the contact object are determined by the NSP. SID 30 is a subscription identifier of the service subscription, whereas CID 31 is the contact identifier of the contact object. Both SID 30 and CID 31 are guaranteed to be globally unique. Subscription description 32 contains the application context of the service subscription in a human-readable format, e.g., "Online status of your buddy John." NSP ADDR 33 specifies the network address of the NSP. In the initial connect and setup process, OBCL manager 28, FIG. 7, uses NSP ADDR 33 to connect to the NSP, if the contact object has been stored on the storage device of the client computer and has been loaded into the runtime environment of the OBCL at startup. FIG. 8b also shows the key attributes of NSP ADDR 33. NSP server network address 35 and NSP server port number 61 reflect the type of network 15 that is used to connect the OBCL to the NSP. For example, if network 15 is the Internet, then NSP server network address 35 is the IP address of the server computer on which the NSP is running and NSP server port number 61 specifies the number of port to which the NSP is listening for connection requests.

Furthermore, the contact object has a smart event 34. As described earlier, smart event 34 contains the current state of the subscription service, i.e., the current state of NSP data items that constitute the contents of the subscription service, and the response instructions that determine if and how the user may respond to smart event 34.

Figure 9:
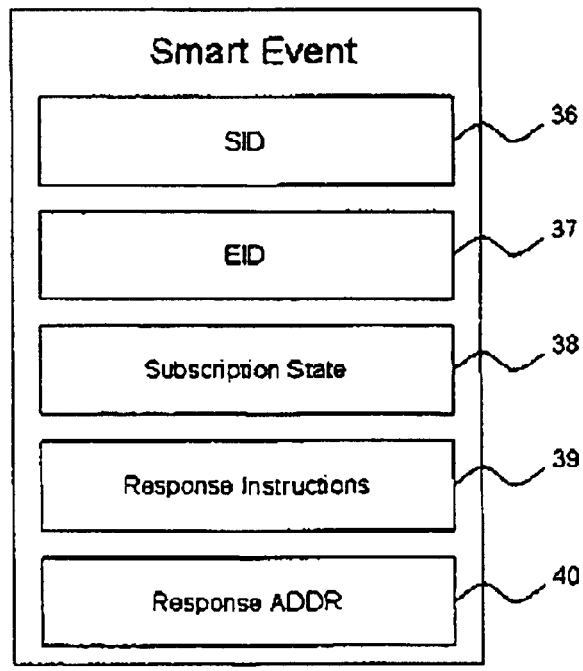
FIG. 9 is a diagram of an illustrative smart event of the present invention.

FIG. 9 shows the key properties of smart event 34. In general, all the attributes of a smart event are specified by the NSP that generates the smart event. In addition to subscription state 38 and response instructions 39, smart event 34 contains an event identifier (EID) 37. EID 37 is used by the NSP to uniquely identify smart event 34 and is guaranteed to be globally unique. Smart event 34 also has a SID 36, which identifies the subscription service, in which smart event 34 is generated. SID 36 is also used by contact manager 29 to identify a contact object to which smart event 34 belongs, i.e. the contact object whose value of SID is same as that of SID 36. Furthermore, smart event 34 has a response ADDR 40, which specifies the network address of the NSP that is to receive a response object from smart event 34. Response ADDR 40 shares the same properties as those of NSP ADDR 33. In one embodiment of the invention, if no response ADDR 40 is specified, the address, by default, is set to the NSP ADDR 33. In another embodiment, if response ADDR 40 is not specified, then the NSP that has generated smart event 34 is not interested in receiving a response object from smart event 34. In such a case, smart event 34 does not create a response object at the completion of response instructions 39.

Figure 10:
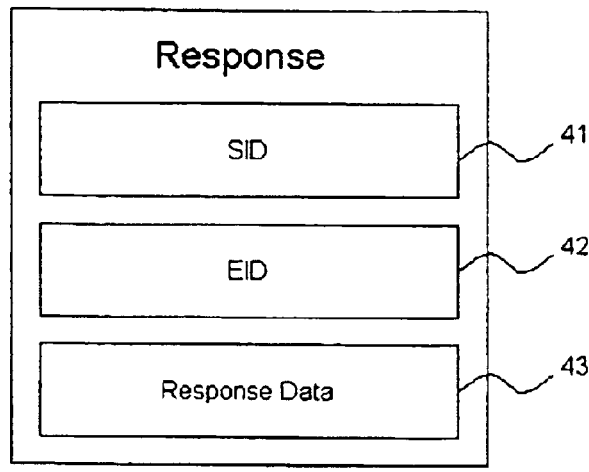
FIG. 10 is a diagram of an illustrative response object of the present invention.

FIG. 10 shows the key properties of a response object that may be created by smart event 34. The response object has an SID 41, which has the same value as SID 36, and an EID 42, which has the same values as EID 37. The response data 43 of the response object typically contains the data values returned from executing response instructions 39. However, this invention imposes no limit on the data contents of response data 43.

Figure 11:
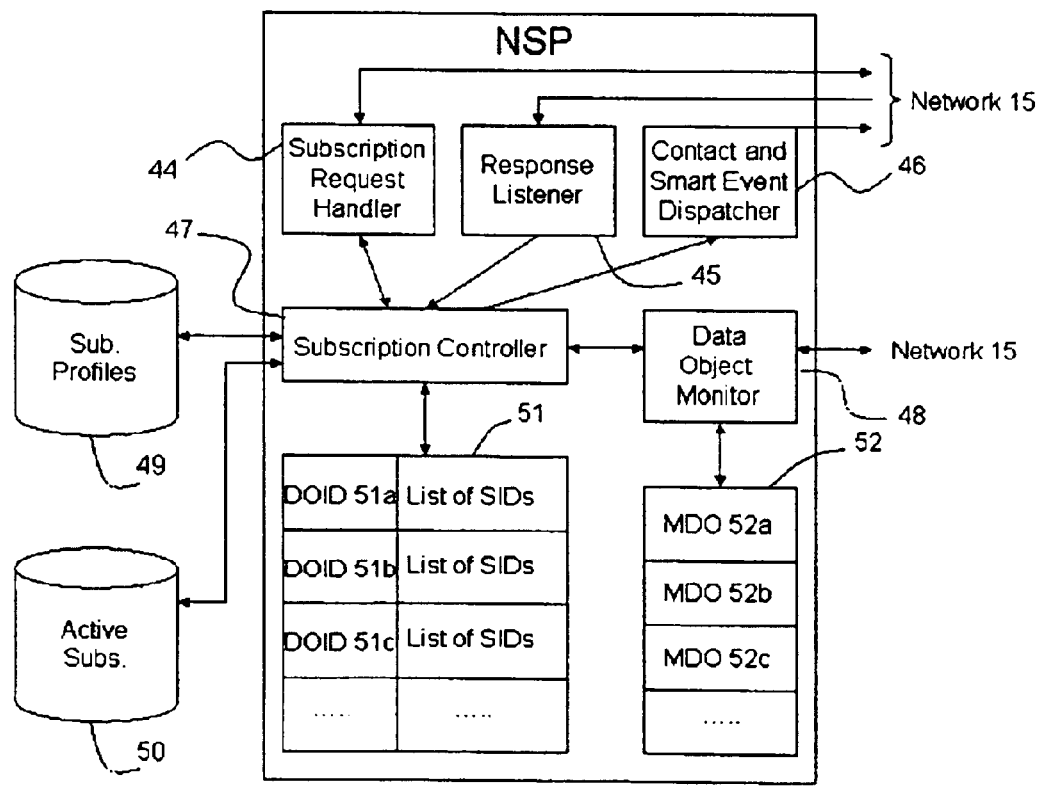
FIG. 11 is a diagram of an illustrative Notification Service Provider of the present invention.

FIG. 11 shows the internal architecture of the NSP server program for NSP 19 in FIG. 1 through FIG. 6. As shown in FIG. 11, the NSP computer program mainly consists of the following components: a subscription request handler 44, a response handler 45, a contact and smart event dispatcher 46, a subscription controller 47, and a data object monitor 48.

Figure 14:
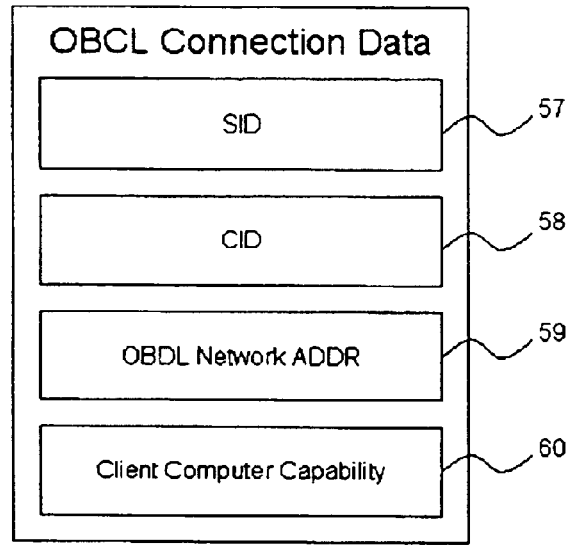
FIGS. 14–16 are flow charts of the smart messaging system of the present invention further illustrating the process of activating a service subscription.

Subscription request handler 44 manages the initial connect and setup process for an OBCL. That is, it receives the connect request from the OBCL, establishes a network connection with the OBCL, authenticates the user, and collects the client computer capabilities of the OBCL. In addition, subscription request handler 44 is responsible for receiving the SID and CID that the OBCL sends after the connect and setup process. In short, subscription request handler 44 collects all the data needed to activate the subscription service of the OBCL. Subscription request handler 44 creates an OBCL connection data object that encapsulates the collected data and sends the object to subscription controller 47. FIG. 14 shows the key properties of OBCL connection data object. Depending on the system configuration of the NSP server program, multiple instances of subscription request handler 44 may exist in the same NSP server program.

Response listener 45 is responsible for receiving response objects and forwarding them to subscription controller 47. Depending on the system configuration of the NSP server program, multiple instances of response listener 47 may exist in the same NSP server program.

Contact and smart event dispatcher 46 is used to send contact objects and smart events to the OBCLs, each of which may have one or more active service subscriptions with the NSP server program. Depending on the system configuration of the NSP server program, multiple instances of contact and smart event dispatcher 46 may exist in the same NSP server program.

Subscription controller 47 manages all the service subscriptions that the NSP server program has. For example, it activates a service subscription when it receives a OBCL connection data from subscription request handler 44, handles response object from response listener 45, and sends contact objects and smart events to appropriate OBCLs via contact and smart event dispatcher 46. In addition, subscription controller 47 manages subscriber profiles database 49 and active subscriber database 50, creating and updating appropriate database records as service subscriptions are activated and state updates occur on data items that are being subscribed. The processes of activating a service subscription and managing subscriber profiles database 49 and active subscriber database 50 are discussed below with reference to the flow charts for these processes.

The NSP server program also has a data object monitor 48. As described above, a data object (DO) encapsulates all the data items that comprise the contents of a service subscription. Data object monitor 48 is responsible for monitoring the data objects of active subscriptions and notifying subscription controller 47 of any state updates on a monitored data object (MDO). FIG. 11 shows that data object monitor 48 may monitor a set of MDOs 52 that reside in the NSP server program and/or a set of MDOs that reside at a remote location via the network 15. In the latter case, data object monitor 48 may communicate with a remote database system or a proxy data object monitor that monitors the MDOs at the remote location and that notifies data object monitor 48 of any state updates.

FIG. 11 also shows that subscription controller 47 manages a data object table 51. Data object table 51 essentially keeps track of data objects that are being monitored by data object monitor 48 and which active subscribers should be notified when a state update occurs on a monitored data object.

A data object encapsulates a set of data items that comprise the contents of a service subscription. In addition, each data object has a data object identifier (DOID) 53 that is used to uniquely identify the data object in the NSP server program. The NSP server program sets the values of both the DOID and the set of data items when the data object is created.

Figure 12A:
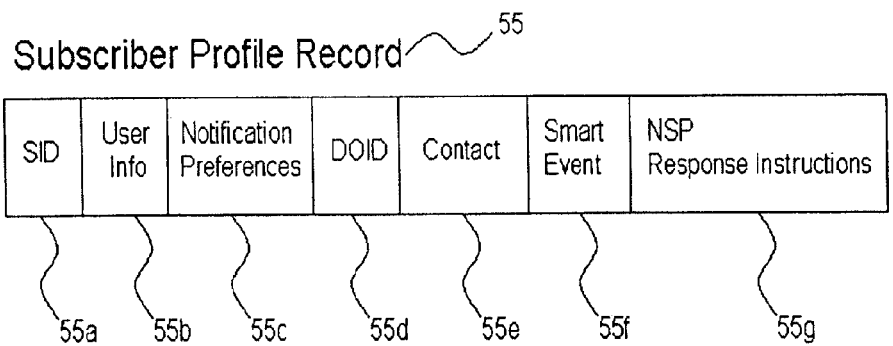
FIG. 12a is a diagram of an illustrative Subscriber Profile Record of the present invention.
Figure 12B:
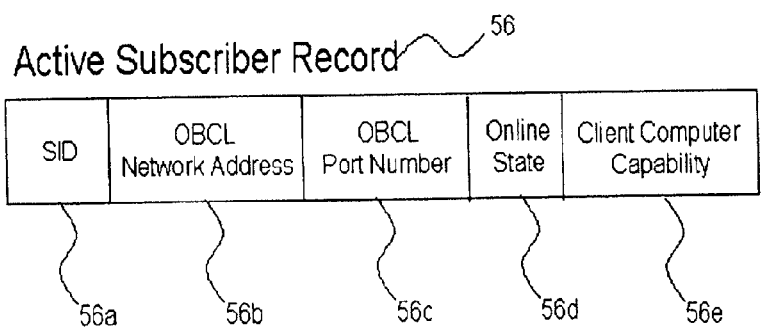
FIG. 12b is a diagram of an illustrative Active Subscriber Record of the present invention.
Figure 13:
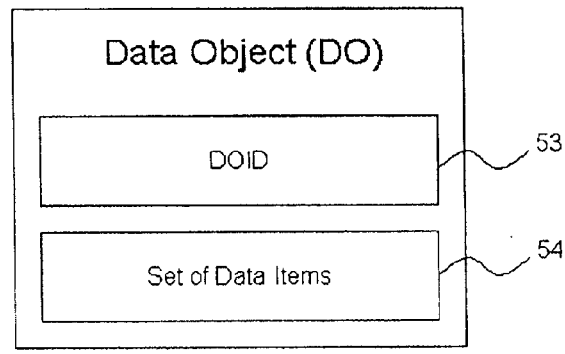
FIG. 13 is a diagram of an illustrative connection data object of the present invention.

FIGS. 12a and 12b show the key fields in a subscriber profile record 55 and in an active subscriber record 56, respectively. Subscriber profile record 55, FIG. 12a, is stored in subscriber profiles database 49 (FIG. 11), and active subscriber record 56 is stored in active subscribers database 50 (FIG. 11). Subscriber profile record 55 contains information on a service subscription and its subscriber, and its record fields include a SID 55a, a User Info 55b, a Notification Preference 55c, a DOID 55d, a Contact 55e, Smart Event 55f, and NSP Response Instructions 55g. SID 55a contains the subscription identifier of the service subscription. User info 55b contains information on the user who subscribes to the subscription, such as a name, a user ID, and a password. Notification preference 55c contains the user's preference settings with respect to the subscription service. For example, for the present subscription service, subscription controller 47 may allow an option of monitoring the data object of the service and keeping track of state updates on the data object even when the user is not active. Another example might be that subscription controller 47 may allow the subscriber to decide when to deliver a smart event, e.g., only when the subscriber is not BUSY. Such user and notification preference settings are stored in notification preference 55c. DOID 55d contains the data object identifier of the data object of the service subscription. Contact 55e stores the last contact object that has been sent to the subscriber's OBCL and is used to determine whether or not a new contact object should be created and sent the subscriber's OBCL at the service activation time. Smart event 55f stores the last smart event object that has been sent to the subscriber's OBCL. NSP response instructions 55g contains program instructions to be executed by subscription controller 47 if and when a response object to the smart event in the smart event 55f field is received.

Active subscriber record 56, FIG. 12b, is stored in active subscribers database 50 and contains information on an active service subscriber. Its fields include a SID 56a, an OBCL Network Address 56b, an OBCL Port Number 56c, an Online State 56d, and a Client Computer Capability 56e. SID 56a contains the subscription identifier of the service to which the active subscriber subscribes. OBCL network address 56b contains the network address of the client computer on which the subscriber's OBCL is running. OBCL port number 56c contains the port number on the client computer to which the subscriber's OBCL listens to accept subscription data, such as the contact object and smart events. For the present service subscription, subscription controller 47 may allow the subscriber to assume different online states, e.g., BUSY and RESPONDING, and online state 56d contains the current online state of the subscriber. Client computer capability 56e contains information on the capabilities of the client computer on which the subscriber's OBCL is running.

As discussed earlier, after the initial connect and setup process, subscription and request handler 44 creates and sends an OBCL connection data object to subscription controller 47. The OBCL connection data object contains information on the subscriber who is attempting to activate his or her service. FIG. 14 shows the key properties of the OBCL connection data object. SID 57 is the subscription identifier of the service subscription of the subscriber. CID 58 is the contact identifier of the contact object that the subscriber's OBCL have received from an earlier activation of the service subscription. OBCL network addr 59 contains the network address and port number of the client computer on which the subscriber's OBCL is running. Client computer capability 60 contains the capabilities of the client computer on which the subscriber's OBCL is running.

Figure 15:
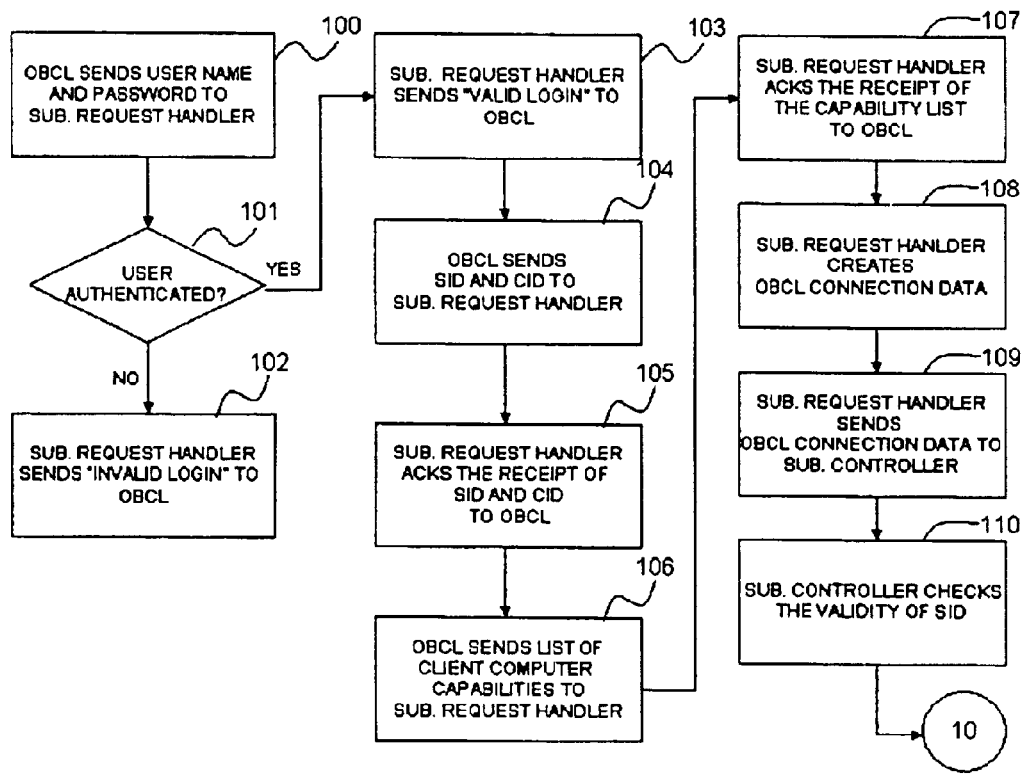
Figure 16:
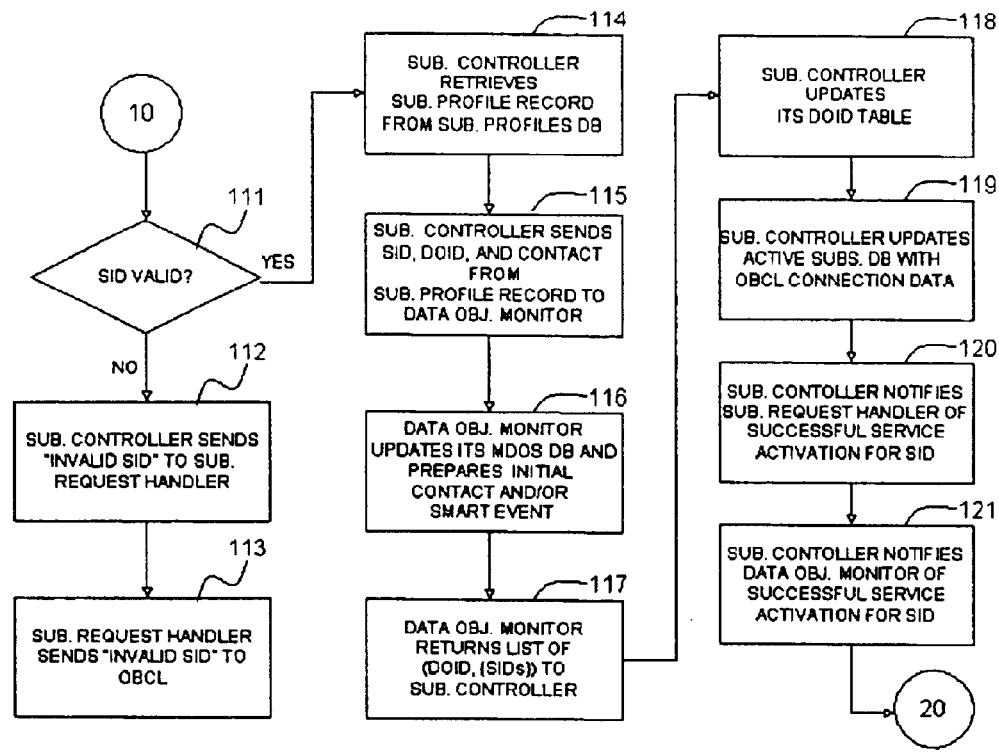

FIG. 14, FIG. 15, and FIG. 16 are flow charts that describe the process, in which subscription controller 47 activates a service subscription. At block 100, a connection has been established with a user's OBCL, and the OBCL sends the user authentication data to subscription request handler 44. At block 101, subscription request handler 44 attempts to authenticate the user with the received authentication data. We assume that subscription request handler 44 has access to resources that can be used to authenticate the user. If the user cannot be authenticated, then subscription request handler 44 sends an "INVALID LOGIN" message to the OBCL at block 102 and goes back to waiting for other service activation requests.

If the user is successfully authenticated, subscription request handler 44 sends a "VALID LOGIN" message to the OBCL at block 103, at which point the OBCL sends an SID and a CID to subscription request handler 44 at block 104. The SID is the subscription identifier of the service subscription that is being activated, and the CID is the identifier of the contact object that the OBCL may have received from an earlier activation of the service subscription. Upon receiving the SID and CID, subscription request handler 44 sends a receive acknowledgement to the OBCL at block 105. Subsequently, the OBCL send a client computer capability list at block 106, and subscription request handler 44 sends another receive acknowledgement to the OBCL at 107. Note that the steps in blocks 104 and 106 can be combined into a single step.

At the completion of block 107, subscription request handler 44 has enough data to create an OBCL connection data object at block 108 and sends the connection data object to subscription controller 47 at block 109. Subscription request handler 44 also saves a copy of the OBCL connection data object for later processing. Subsequently, subscription request handler 44 goes back to waiting for other service activation requests.

When subscription controller 47 receives the OBCL connection data object, it checks the validity of the SID in the connection data object at block 110. The SID is valid if subscription controller 47 can find a subscriber profile record that has the SID. If the validity check fails at block 111, FIG. 15, subscription controller 47 sends an "INVALID SID" message to subscription request handler 44 at block 112, which in turn sends the "INVALID SID" message to the OBCL and then removes the OBCL connection object created at block 108.

If the SID validity check is successful, subscriber controller 47 retrieves the appropriate subscriber profile record from its subscriber profiles database 49 at block 114. At this point, subscriber controller 47 also stores the OBCL connection data object for later processing. Subsequently, subscriber controller 47 sends the subscriber profile record to data object monitor 48 at block 115. Upon receiving this record, data object monitor 48 updates its set of monitored data objects 52 at block 116. In addition, data object monitor 48 may create a new contact object and/or a smart event to be sent to the OBCL at the completion of the service activation process. The smart event contains the latest state of the data object of the service subscription. Subsequently, data object monitor 48 sends a list of (DOID, {SIDs}) tuples to subscriber controller 47 at block 117, which in turn updates its data object table 51 accordingly at block 118. Subsequently, at block 119, subscriber controller 47 creates a new active subscriber record based on the OBCL connection data object that is previously stored at block 114, and stores the new record in its active subscriber database 50. At this point, the service subscription is considered activated.

At block 120, subscription controller 47 notifies subscription request handler 44 that the service subscription whose identifier is the SID is now activated. Subscription request handler 44 then sends a service activation message for the service subscription SID to the OBCL and removes the corresponding OBCL connection data object previously created at block 108.

At block 121, subscription controller 47 notifies data object monitor 48 that the service subscription whose identifier is the SID is now activated. Subsequently, data object monitor 48 returns the SID and any contact object and/or smart event created at block 116 to subscription controller 47 at block 122, FIG. 16. At block 123, subscription controller 47 first determines the response instructions for the smart event of the received contact object and/or for the received smart event. Subscription controller 47 may also determine the NSP response instructions for the smart event of the received contact object and/or for the received smart event, in which case it prepares response listener 45 to receive the corresponding response object(s). Subscription controller 47 then updates the appropriate properties of the smart event of the received contact object and/or of the received smart event. Subsequently, subscription controller 47 updates the subscriber profile record of the SID with the received contact object and/or smart event.

At block 124, subscription controller 47 retrieves the active subscriber record of the SID. At block 125, subscription controller 47 transforms the contact object and/or smart event according to the client computer capability in the active subscriber record of the SID. Subscription controller 47 may perform the transformation itself or delegate the task to a third party entity located on the same server computer as subscription controller 47 or at a remote location on a network. Once the transformation task is complete, subscription controller 47 asks contact and smart event dispatcher 46 to send the transformed contact object and/or smart event to the OBCL at block 126. Subsequently, contact and smart event dispatcher 46 sends the transformed the contact object and/or smart even to the OBCL at block 127 and/or at block 128.

Figure 17:
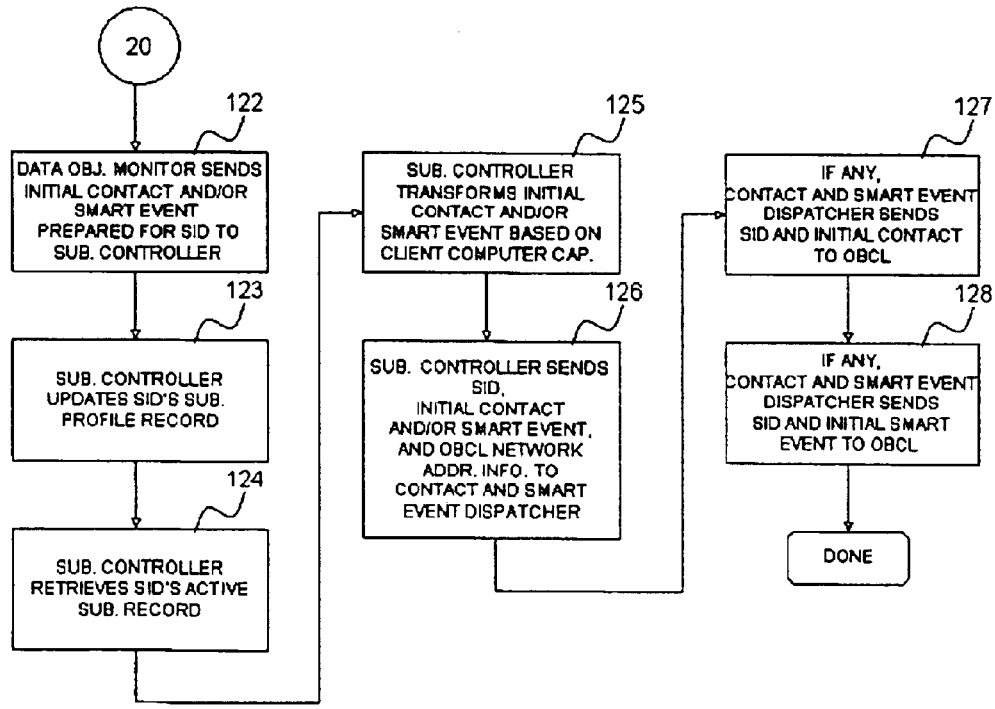
FIG. 17 is a flow chart of the smart messaging system of the present invention further illustrating the process of sending smart events.

FIG. 17 describes in detail the process of sending a smart event to the OBCL. At block 200, data object monitor 48 detects a state update on a monitored data object. At block 201, data object monitor 48 creates a smart event that contains the current state of the monitored data object. At block 202, data object monitor sends the DOID of the monitored data object whose state has been updated and the new smart event to subscription controller 47.

At block 203, subscription controller 47 uses the received DOID to determine from its data object table 51 all the SIDs, each of which is a service subscription for the updated data object. For each SID, subscription controller 47 repeats the following steps.

At block 204, subscription controller 47 first determines the response instructions for the received smart event. Subscription controller 47 may also determine the NSP response instructions for the received smart event, in which case it prepares response listener 45 to receive the corresponding response object. Subscription controller 47 then updates the appropriate properties of the received smart event. Subsequently, subscription controller 47 updates the subscriber profile record of the SID with the received smart event and the NSP response instructions, if any. At block 205, subscription controller 47 checks if the service subscription identified by the SID is active. If not, subscription controller 47 proceeds to process the next SID. If so, subscription controller 47 retrieves an appropriate active subscriber record from its active subscriber database 50 at block 206. Subsequently, subscription controller 47 transforms the smart event according to the client computer capability in the retrieved active subscriber record. Subscription controller 47 may perform the transformation itself or delegate the task to a third party entity located on the same server computer as subscription controller 47 or at a remote location on a network. Once the transformation task is complete, subscription controller 47 asks contact and smart event dispatcher 46 to send the transformed smart event to the destination OBCL at block 208. Subsequently, contact and smart event dispatcher 46 sends the transformed the smart event to the destination OBCL at block 209.

Once all the SIDs are accounted for at block 203, subscription controller 47 notifies data object monitor 48 of the completion of processing the smart event created at block 201.

Figure 18:
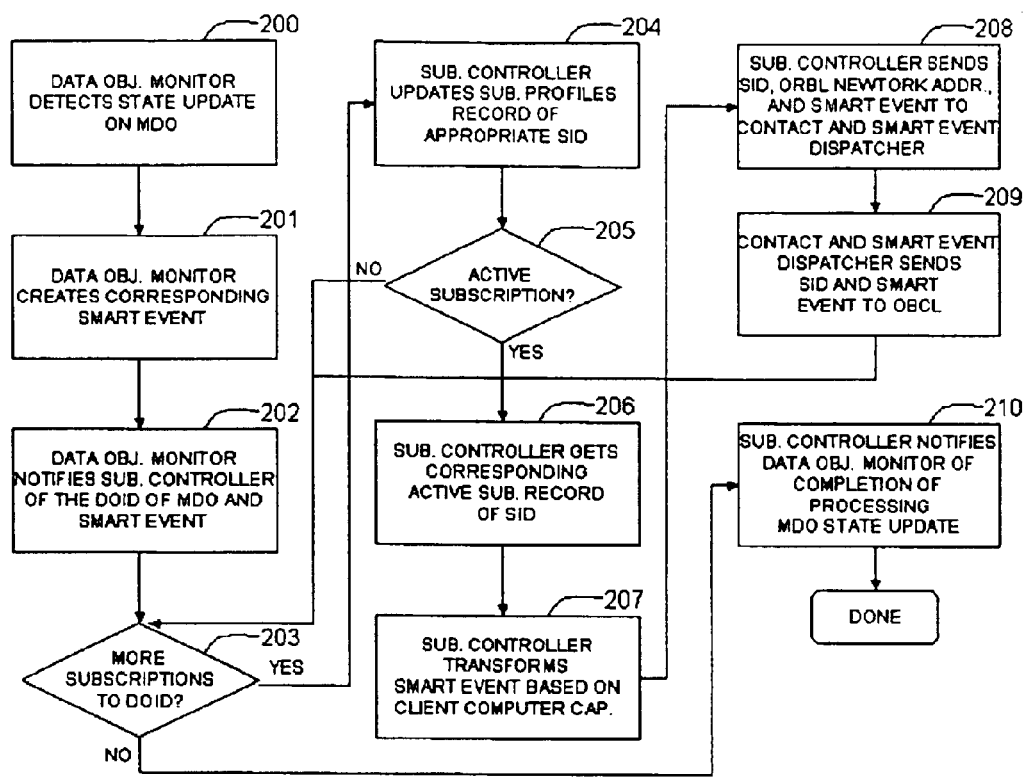
FIG. 18 is a flow chart of the smart messaging system of the present invention further illustrating the processing of response objects.

FIG. 18 is a flow chart for processing a response object. At block 300, response listener 45 receives a response object. At block 301, response listener 45 forwards the received response object to subscription controller 47. Subsequently, subscription controller 47 checks for the validity of the SID in the received response object at 302. The SID is valid if subscription controller 47 can find a subscriber profile record that has the SID. If not valid, subscription controller 47 notifies response listener 45 of the "INVALID SID" error at block 303, at which point response listener 45 sends an "INVALID SID" error message to the OBCL who sent the response object.

If the SID validity check at block 302 is successful, subscription controller 47 retrieves an appropriate subscriber profile record from its subscriber profiles database 49 at block 304. At block 305, subscription controller 47 checks the EID of the smart event in the retrieved subscriber profile record against the EID of the received response object. If the EIDs match, then at block 308, subscription controller 47 executes the NSP response instructions in the retrieved subscriber profile record with the response data in the received response object.

If the EIDs do not match at block 305, it means that the subscriber who has sent the response object has responded to an old smart event. Hence, subscription controller 47 notifies response listener 45 of the "EID MISMATCH" error at block 307, at which point response listener 45 sends an "EID MISMATCH" error message to the OBCL who sent the response object.

Figure 19:
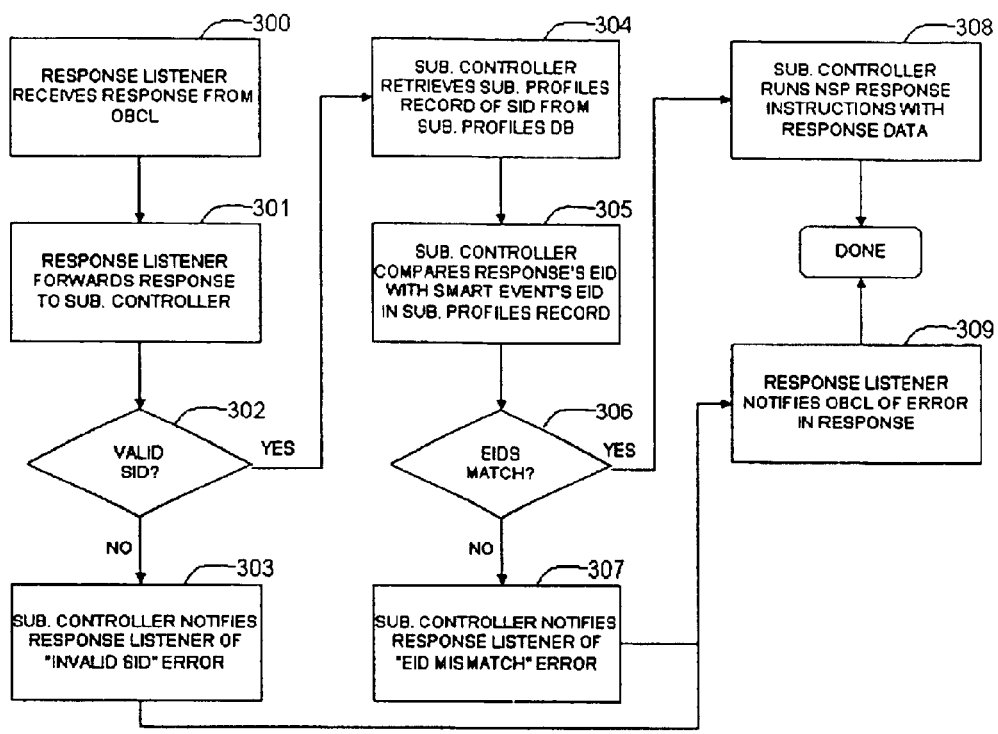
FIG. 19 is a flow chart of the smart messaging system of the present invention further illustrating the processing of contact objects.
Figure 20:
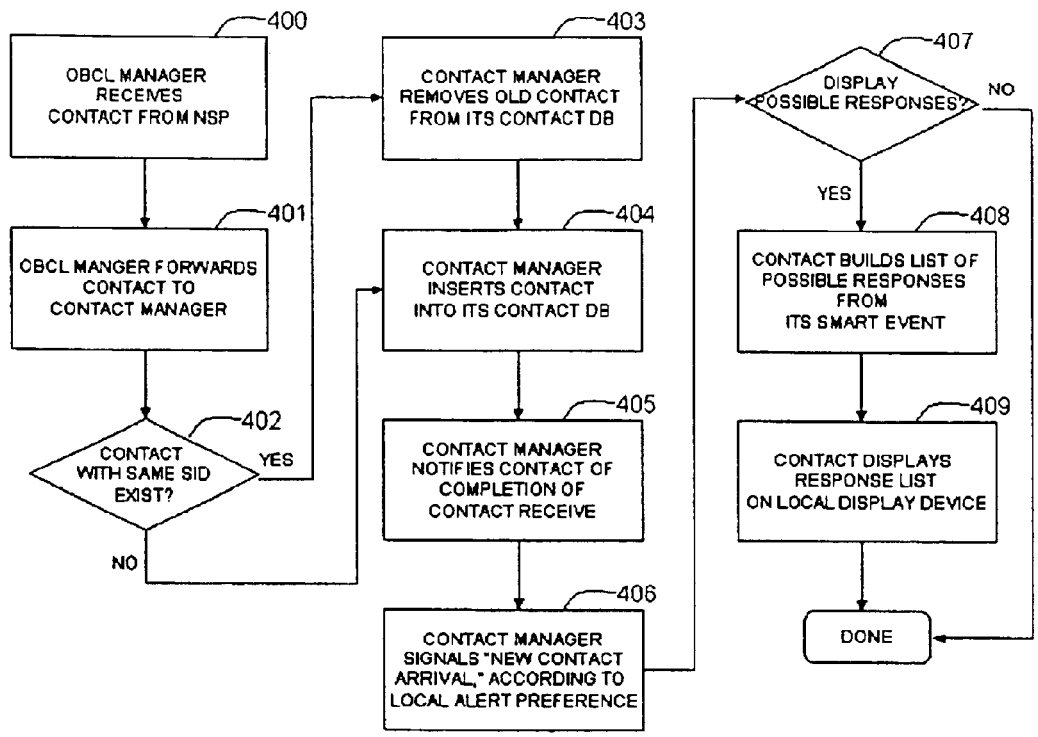
FIG. 20 is a flow chart of the smart messaging system of the present invention further illustrating the processing of smart events.

FIG. 19 shows a flow chart that describes in detail the OBCL's processing of a contact object. At block 400, OBCL Manager 28 receives a contact object from an NSP. At block 401, OBCL Manager forwards the received contact object to contact manager 29. Subsequently, at block 402, contact manager 29 checks to see if there already exists a contact object with the same SID as that of the received contact object. If such a contact object is found, contact manager 29 first removes the old contact object from its contact object database at block 403 and then inserts the new contact object into its contact object database at block 404. Subsequently, contact manager 29 signals to the new contact object that it has been completely received at block 405 and then alerts to the user that the new contact object has been received at block 406. The exact manner in which the alerting of the receipt of a new contact object is performed may depend on the user preferences and/or the type of the client computer on which the OBCL is running. For example, as shown in FIG. 20, the user may have set the OBCL so that when a new contact object has arrived, contact manager 29 not only shows the subscription description of the new contact object, but also automatically displays the list of possible responses that are available in the smart event encapsulated in the new contact object (blocks 407,408, and 409). The response instructions of a smart event may allow the user to respond to the smart event in a number of different ways. For example, if the smart event is implemented in an object-oriented language, e.g., Java, the different responses of the smart event may be presented in terms of class methods, in which case an class introspection mechanism can be used to discover these methods at runtime. Another example might be that if the OBCL is running on a cellular phone, then contact manager 29 may audibly "ring" or vibrate the phone when a new contact object arrives, instead of or in addition to displaying the alert message on the display panel of the phone.

FIG. 20 shows the OBCL's processing of a smart event. At block 500, OBCL manager 28 receives a smart event from an NSP. At block 501, OBCL manager 28 forwards the received smart event to contact manager 29. At block 502, contact manager 29 first finds in its contact object database a contact object with the same SID as that of the new smart event. If such a contact object does not exist, contact manager 29 notifies OBCL manager 28 of an "INVALID SID"error at block 503, at which time OBCL manager 28 sends an "INVALID SID" error message to the NSP at block 507.

At block 502, if a contact object whose SID is equal to the SID of the new smart event is found, contact manager 29 replaces the old smart event of the contact object with the new smart event at block 504. Subsequently, contact object 29 notifies the new smart event that it has been completely received at block 505. Then contact object 29 executes code contained in smart events. This code might alert the user that a new smart event has been received. As with processing of a contact object in FIG. 19, the specific manner in which the alerting of the receipt of a new smart event is performed may depend on the user preferences and/or the type of the client computer on which the OBCL is running. For example, as shown in FIG. 20, the user may have set the OBCL so that when a new smart event is received, contact manager 29 may automatically display the list of possible responses that are available in the new smart event (blocks 508,509, and 510). Furthermore, the user may set the OBCL so that the default response instructions of the new smart event are automatically executed. If the OBCL is running on a cellular phone, then contact manager 29 may audibly "ring" or vibrate the phone when a new contact object arrives, instead of or in addition to displaying the alert message on the display panel of the phone.

Figure 21:
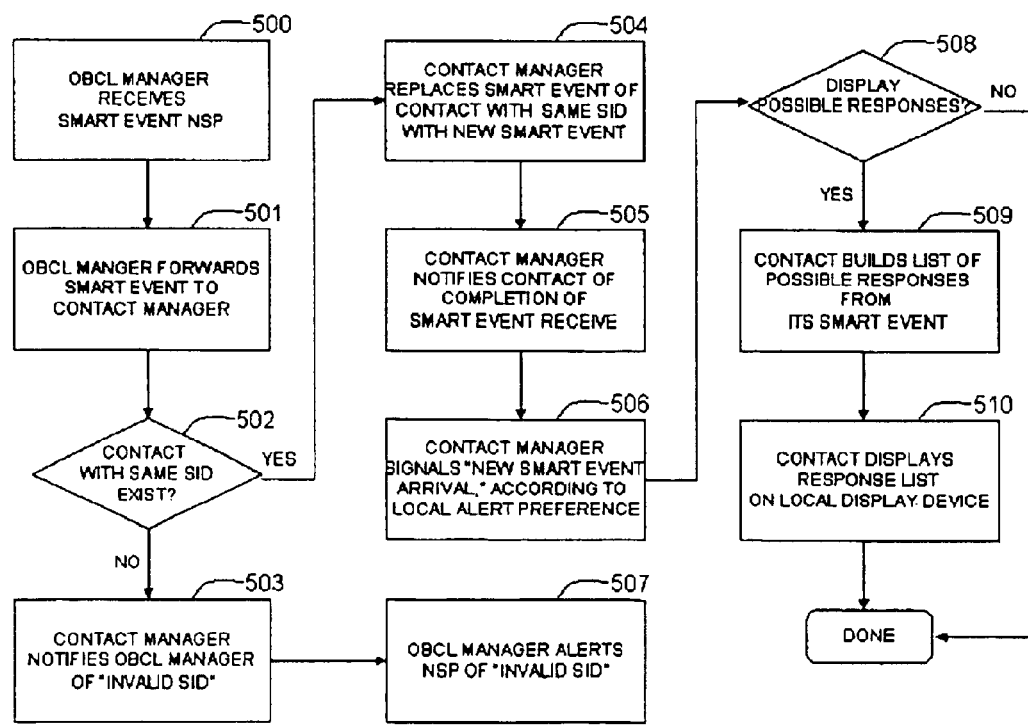
FIG. 21 is a flow chart of the smart messaging system of the present invention further illustrating the execution of the response instructions of a smart event.
Figure 22:
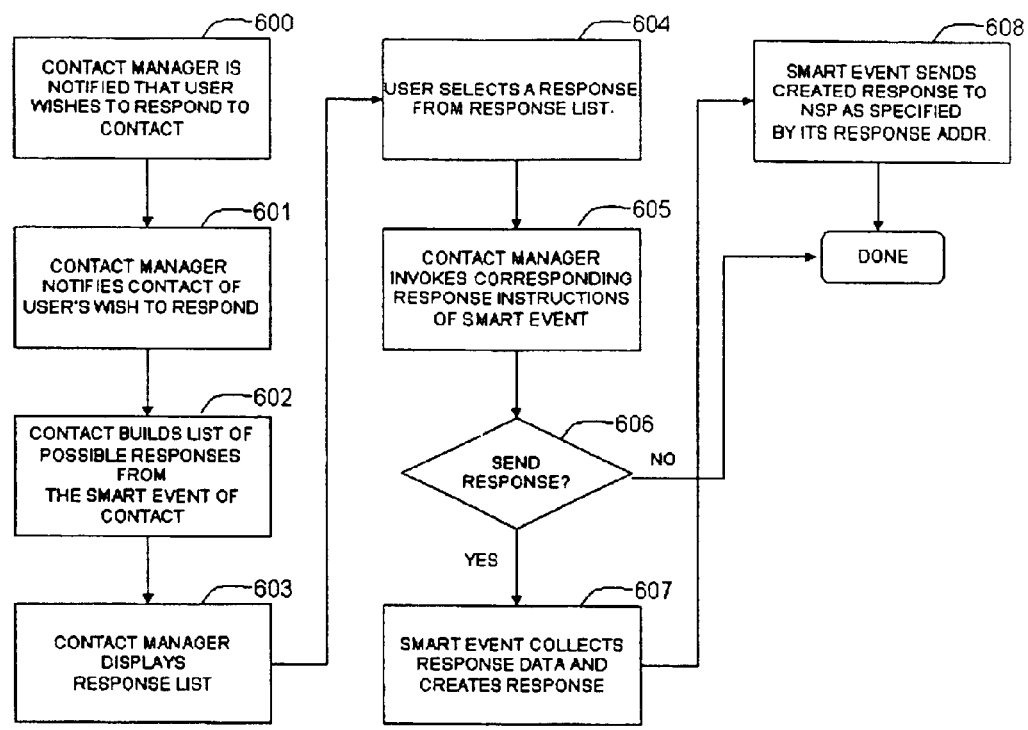
FIG. 22 is a flow chart that describes in detail how the OBCL executes the response instructions of a smart event.

FIG. 21 is a flow chart that describes in detail how the OBCL executes the response instructions of a smart event. At block 600, contact manager 29 is notified that the user wishes to respond to the smart event of a contact object. At block 601, contact manager 29 notifies the contact object of the user's wish. It should be noted that an alternative implementation of the OBCL may allow the user to directly interact with the contact object and bypass the step at block 600.

Subsequently, at block 602, the contact object discovers all the possible responses of its smart event and sends the list to contact manager 29. At block 603, contact manager 29 displays the list of possible responses on the display device of client computer 10 and alerts the user to select a response. Alternatively, contact manager 29 may audibly "play" the list. When the user selects a response at block 604, contact manager 29 then instructs the smart event to execute appropriate response instructions at block 605. It should be noted that if the smart event contains only a single response, contact manager may skip block 603 and block 604 and directly move to block 605.

Once the smart event completes executing its response instructions at block 605, it checks to see if the NSP who has generated the smart event wishes a response object at 606. If so, it creates a response object and sends the response object to the address specified in its NSP ADDR property at block 608. It is also possible that the smart event generates and sends a response object during its execution of the response instructions.

In one specific embodiment of this invention, the OBCL client program and its internal components, e.g., OBCL manager and contact manager, and the NSP server program and its internal components, e.g., subscription controller and data object monitor, are written in an object-oriented language, such as Java. Also the OBCL client program and the NSP sever program run on client and server computers that are connected to an IP network, e.g., the Internet. The OBCL client process and the NSP server process may communicate with each other by exchanging messages over TCP/IP. A wireless network could be used. Alternatively, UDP/IP may be used as a message transport mechanism if the OBCL client process and the NSP server process have a mechanism for ensuring reliable and in-order message delivery, e.g., sequence numbers and acks. A message between the OBCL client process and the NSP server process may contain an "object," e.g. the NSP server process sends a smart event to the OBCL client process. In such a case, the message contains a bit stream that results when the object is serialized. When the destination process receives the message, it creates a local copy of the object within its runtime address space by de-serializing the bit stream in the message. An alternative embodiment of this invention may also use remote object references when passing objects between the OBCL client process and NSP server process. Examples of the use of our invention include:

Instant Messaging—the OBCL can be used in the traditional instant messaging service. In such a case, a Contact object represents a buddy, and the SmartEvent object associated with the Contact contains the buddy's current presence state and the instant messaging protocol used to establish instant messaging sessions, send e-mail etc. This design allows the same OBCL to subscribe to different instant messaging services at the same time, e.g., AOL Instant Messenger and MSN Messenger services, by encapsulating the provider-specific data in SmartEvent objects, e.g., presence and instant messaging protocols.

Network Appliance Monitor and Control—for example, the OBCL has a Contact object that represents a networked residential thermostat. The NSP may monitor the thermostat and periodically or per request, the NSP sends a SmartEvent object to the OBCL. The SmartEvent object contains the current temperature setting and allows the OBCL to change the setting.

Alerts in E-Commerce—for example, the OBCL can be used to receive and update a user's bid on some product at an auction site.

Web-based Call Center—for example, the OBCL can be used to alert the customer who has called in to a Web-based call center of the length of the wait queue, the customer's position in the wait queue, etc.

What is claimed:

1. A system for general purpose interactive notifications comprising
a plurality of server computers each including a notification service provider,
a client computer including an object based contact system employing lists, said object based contact system employing lists including a first manager for communicating with said notification service providers of said server computers and a contact manager for managing contact objects and smart events forwarded to it by said first manager, said smart events including both state information on client data items and also program instructions that specify how the object based contact system responds to said smart events, and
a net work interconnecting said server computers and said client computer.

2. The system in accordance with claim 1 wherein said first manager authenticates users to said notification service providers and receives contact objects and smart events from said notification service providers.

3. The system in accordance with claim 2 wherein
a contact object includes a service identification, a contact identifier of the contact object, a service subscription description, the network address of a notification service provider, and
a smart event contains the current state of the subscription service.

4. The system in accordance with claim 1 wherein said smart events further include an event identifier, identification of the subscription service, response program instructions, and a response address specifying the network address of the notification service provider which is to receive a response object.

5. The system in accordance with claim 1 wherein said notification service provider comprises a subscription request handler and a response listener, both connected to said network, a connect and smart event dispatcher, a subscription controller, and a data object monitor connected to said network.

6. A method for notification service data flow in a general purpose interactive notification system including a client computer having an object based contact system employing lists (OBCL) and a plurality of server computers each including a notification service provider (NP), said method comprising the steps of:

said OBCL connecting to said NP, sending data regarding the capabilities of said client computer to said NP, sending a subscription identifier to said NP, and sending a contact identifier to said NP, and said NP sending notifications to said OBCL whenever state updates occur on the data items that comprise the subscription contents of said OBCL, said notifications including smart events and said smart events including both state information on subscriber data items and also program instructions that specify how said OBCL responds to each smart event.

* * * * *